United States Patent [19]

Ballard et al.

[11] 4,425,756

[45] Jan. 17, 1984

[54] GAS TURBINE ENGINE AND ITS ASSOCIATED AIR INTAKE SYSTEM

[75] Inventors: John R. Ballard, Chesham; George H. Bennett, Hendon; Leslie A. Lee, Whitton, all of England

[73] Assignee: Rolls-Royce Limited, London, England

[21] Appl. No.: 347,332

[22] Filed: Feb. 9, 1982

[30] Foreign Application Priority Data

Mar. 20, 1981 [GB] United Kingdom ................ 8108769

[51] Int. Cl.³ ............................................. F02C 7/052
[52] U.S. Cl. .................................. 60/39.092; 55/306
[58] Field of Search ...................... 60/39.092; 55/306; 415/121 G; 137/15.1

[56] References Cited

U.S. PATENT DOCUMENTS

| | | | |
|---|---|---|---|
| 3,329,377 | 7/1967 | Petersen et al. | 60/39.092 |
| 3,766,719 | 10/1973 | McAnally | 60/39.092 |
| 4,265,646 | 5/1981 | Weinstein et al. | 60/39.092 |
| 4,346,860 | 8/1982 | Tedstone | 60/39.092 |

Primary Examiner—Louis J. Casaregola
Attorney, Agent, or Firm—Cushman, Darby & Cushman

[57] ABSTRACT

A gas turbine engine and its associated air intake system in which the air intake system comprises a generally horizontally extending duct through which an airflow is induced by an ejector pump powered by the engine. A portion of the air passing through the duct is directed through a second duct to the air inlet of the engine. The second duct is connected to the first duct in such a manner that the air directed to the engine air inlet is derived from a vertically upper region of the first duct. The arrangement is intended to reduce the amount of airborne particulate material ingested by the gas turbine engine.

4 Claims, 2 Drawing Figures

GAS TURBINE ENGINE AND ITS ASSOCIATED AIR INTAKE SYSTEM

This invention relates to a gas turbine engine and its associated air intake system with particular reference to an air intake system adapted to separate airborne particulate material from air entering the engine.

Aircraft mounted gas turbine engines are highly susceptible to damage resulting from their ingestion of airborne particulate material. This is particularly so in the case of gas turbine engines which power helicopters since helicopters are frequently required to operate at low altitude in situations where large amounts of particulate material are present.

One method of reducing the amount of airborne particulate material ingested by helicopter gas turbine engines is to provide a duct which extends along a portion of the helicopter structure and through which an air flow is induced by an ejector pump powered by the exhaust efflux of the engine. At a position along the length of the duct a second duct interconnects the first duct with the air inlet portion of the engine. The arrangement is such that any particulate material which is drawn in through the first duct is carried along the whole length of that duct and exhausted into the engine efflux thereby avoiding being drawn into the second duct and hence the engine air inlet. However, the configuration of the air intake system is usually such that there is a danger of larger pieces of particulate material falling into the second duct under the influence of gravity. This being so, the flow rate of air through the first duct has to be of such a magnitude that the larger particulate material pieces are carried by the air flow, thereby avoiding the second duct. Such a high air flow rate is undesirable in view of the amount of power required to sustain it.

It is an object of the present invention to provide a gas turbine engine and its associated air intake system in which the flow rate of the air passing through the first duct may be lowered without any increase in the amount of particulate material ingested by the engine.

According to the present invention, a gas turbine engine and its associated air intake system comprises a gas turbine engine, a first generally horizontally extending duct adapted for the passage of air therethrough, means adapted to induce an air flow through said first duct, a second duct interconnecting a portion of the first duct with the air inlet of said gas turbine engine whereby at least part of the air passing in operation through said first duct is directed through said second duct to said air inlet of said gas turbine engine, said second duct being connected to said first duct at such a position that air directed through said second duct is derived from a vertically upper region of said first duct.

Said gas turbine engine and said first duct of said air intake system are preferably juxtaposed so that the majority of said first duct is located vertically above the majority of said gas turbine engine.

Said means adapted to induce an airflow through said first duct may comprise an ejector pump powered in operation by the exhaust efflux of said gas turbine engine.

Said first duct of said air intake system may be provided with a forward facing air inlet.

The invention will now be described by way of example with reference to the accompanying drawings in which.

Figure 1:
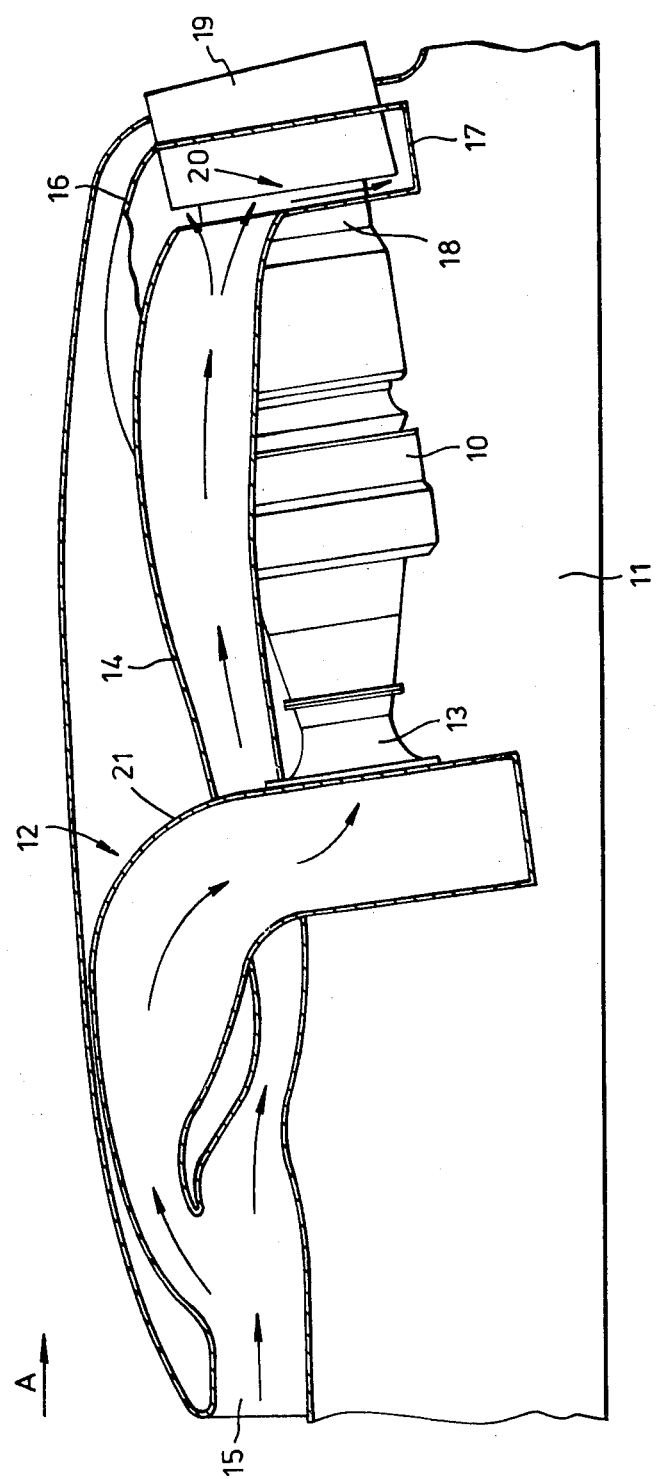
FIG. 1 is a partially sectioned side view of a gas turbine engine and its associated air intake system in accordance with the present invention.

With reference to FIG. 1, a gas turbine engine 10 is one of two similar engines mounted by means not shown in side-by-side relationship within the upper part of the fuselage of a helicopter 11. Each of the gas turbine engines 10 is associated with an air intake system 12 which is adapted to separate airborne particulate material from air which enters the inlet 13 of the gas turbine engine 10. Since the air intake systems 12 are of similar construction and operate in a similar manner, only the system 12 shown in FIG. 1 will be described.

Figure 2:
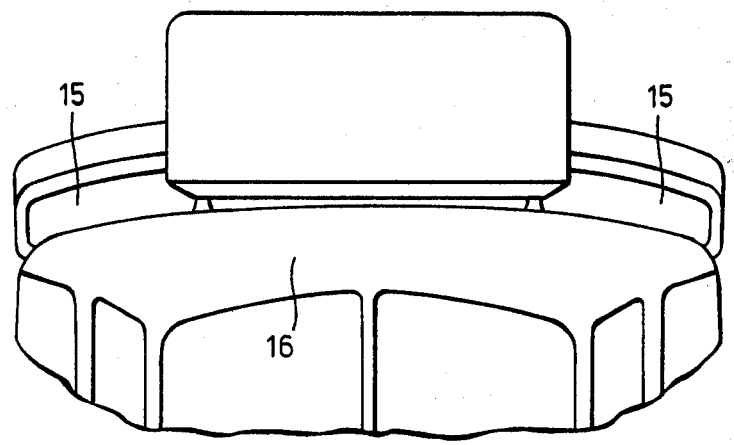
FIG. 2 is a view in the direction of arrow A showing the location of part of the air intake system in relation to the cockpit of a helicopter provided with two gas turbine engines and their associated air intake systems in accordance with the present invention.

The air intake system 12 comprises an elongate, generally horizontally extending duct 14 which is located within the helicopter 11 fuselage and which has a forward facing air inlet 15. The forward facing air inlets 15 of both air intake systems 12 can be seen in FIG. 2 where their relationship with the cockpit 16 of the helicopter 11 is shown as is their cross-sectional configurations.

The duct 14 and the gas turbine engine 10 are juxtaposed so that the majority of the duct 14 is located vertically above the majority of the engine 10. The downstream end 16 of the duct 14 is, however, developed into the form of a volute 17 which surrounds the exhaust nozzle 18 and tail pipe 19 of the gas turbine engine 10 so that together they define an ejector pump 20. Thus in operation, the exhaust efflux from the gas turbine engine 10 powers the ejector pump 20 and causes it to induce an air flow through the duct 14 which is exhausted to atmosphere via the tail pipe 19. It will be appreciated however that in certain circumstances means other than an engine exhaust efflux driven ejector pump may be used for inducing an airflow through the duct 14.

The duct 14 and the air inlet 13 of the gas turbine engine 10 are interconnected by a second duct 21. More specifically, the second duct interconnects the gas turbine engine air inlet 13 with a portion of the first duct 14 which is a short distance downstream of the first duct air inlet 15 and is located in the vertically upper part of the first duct 14. Consequently the air which enters the inlet 13 of the gas turbine engine 10 is derived from the vertically upper portion of the first duct 14.

If the air which enters the first duct 14 carries particulate material, the airflow through the first duct 14 tends to carry the particulate material along the first duct 14 so that air entering the second duct 21 is substantially free of particulate material. After passing through the first duct 14, the particulate material is exhausted to atmosphere through the tail pipe 19.

Two important advantages accrue from the air inlet system 12 in accordance with the present invention when compared with an air inlet system which differs in that air for the gas turbine engine is derived from air passing along the vertically lower portion of the first duct 14. Thus if the air entering the first duct air inlet 15 carries heavy particulate material such as ice shed from the helicopter fuselage, that material travels along the vertically lower portion of the first duct 14 and is exhausted through the tail pipe 19. However in the case of an air inlet system having a second duct which takes air from the vertically lower portion of the first duct, heavy particulate material tends to fall into the second duct and hence the air intake 13. In order to counter this tendency, it becomes necessary to increase the flow rate of air through the first duct, thereby increasing the amount of work which has to be done by the gas turbine engine 10 in powering the ejector pump 20.

The second advantage accrues from the fact that in addition to carrying particulate material, the air which enters the first duct air inlet 15 frequently includes a boundary layer of air which has passed over hot portions of the helicopter 11 such as its gearbox. This boundary layer of air tends to accumulate in the vertically lower region of the first duct 14 and is consequently drawn into the air inlet 13 of the gas turbine engine 10 if air for the engine is taken from the vertically lower region of the first duct 14. Since the boundary layer consists of heated air, that air is obviously disadvantageous to the efficient operation of the gas turbine engine 10. It becomes necessary therefore to provide some form of boundary layer diverter to break up the hot boundary layer after it has entered the first duct 14. Since in the air intake system 12 in accordance with the present invention, air for the gas turbine engine 10 is taken from the vertically upper region of the first duct 14, such a boundary layer diverter is unnecessary.

We claim:

1. A gas turbine engine and its associated air intake system comprising:

a gas turbine engine having an air inlet at one end thereof and an exhaust nozzle at the other end thereof with a tail pipe extending downstream therefrom, said gas turbine engine being mounted on a generally horizontal axis;

a first generally horizontally extending duct having an air intake at one end and an outlet at the other end and arranged for the passage of air therethrough, said first generally horizontally extending duct having a major portion thereof positioned juxtaposed to and vertically above a major portion of said gas turbine engine;

means for inducing an air flow through said first duct;

and a second duct connected at its upstream end to the vertical upper portion of said first duct and extending to and connected with said air inlet of said gas turbine engine, said second duct receiving air derived only from a vertically upper region of said first duct and passing the same therethrough into the intake of said gas turbine engine without drawing a hot boundary layer of air into the intake of said gas turbine engine.

2. A gas turbine engine and its associated air intake as claimed in claim 1 wherein said means adapted to induce an airflow through said first duct comprises an ejector pump powered in operation by the exhaust efflux of said gas turbine engine.

3. A gas turbine engine and its associated air intake system as claimed in claim 1 wherein said air inlet of said first duct is forward facing.

4. A gas turbine engine and its associated air intake system as claimed in claim 2 wherein said ejector pump includes a volute surrounding said exhaust nozzle of said gas turbine engine for discharging air from said outlet of said first duct into said tail pipe with exhaust efflux being discharged from said exhaust nozzle of said gas turbine engine.

* * * * *